United States Patent [19]

Parker

[11] Patent Number: 4,885,663

[45] Date of Patent: Dec. 5, 1989

[54] FIBER OPTIC LIGHT EMITTING PANEL AND METHOD OF MAKING SAME

[75] Inventor: Jeffrey R. Parker, Concord, Ohio

[73] Assignee: Lumitex, Inc., North Royalton, Ohio

[21] Appl. No.: 171,844

[22] Filed: Mar. 22, 1988

[51] Int. Cl.⁴ .............................................. F21V 8/00
[52] U.S. Cl. ...................................... 362/32; 362/330
[58] Field of Search ............... 363/32, 103, 100, 296, 363/297, 299, 300, 307, 337, 255, 293, 308, 339, 330; 65/3.11, 42, 4.21, 4.4; 139/440, 441, 420 R, 383 R

[56] References Cited

U.S. PATENT DOCUMENTS

| | | |
|---|---|---|
| 2,480,178 | 8/1949 | Zinberg . |
| 2,654,398 | 10/1953 | Hazelton ......................... 139/383 R |
| 3,043,947 | 7/1962 | Albinger, Jr. . |
| 3,261,349 | 7/1966 | Wallace ............................ 362/32 |
| 3,508,589 | 4/1970 | Derick et al. . |
| 3,760,179 | 9/1973 | Addington, Jr. . |
| 3,825,336 | 7/1974 | Reynolds ............................ 362/32 |
| 4,141,058 | 2/1979 | Mizohata et al. ................. 362/32 |
| 4,181,159 | 1/1980 | Frohlich et al. .................. 139/431 |
| 4,234,907 | 11/1980 | Daniel . |
| 4,257,084 | 3/1981 | Reynolds . |
| 4,323,951 | 4/1982 | Pasco . |
| 4,373,282 | 2/1983 | Wragg . |
| 4,380,794 | 4/1983 | Lawson ........................... 362/804 |
| 4,422,719 | 12/1983 | Orcutt . |
| 4,460,940 | 7/1984 | Mori .............................. 362/293 |
| 4,466,697 | 8/1984 | Daniel . |
| 4,519,017 | 5/1985 | Daniel ............................ 362/32 |
| 4,530,041 | 7/1985 | Yamai et al. ..................... 362/339 |
| 4,562,515 | 12/1985 | Lautzenheiser ................. 362/339 |
| 4,646,205 | 2/1987 | Schumaker ..................... 362/804 |
| 4,688,598 | 8/1987 | Klös ................................ 139/431 |
| 4,733,700 | 3/1988 | Griffth ........................ 139/383 R |
| 4,779,166 | 10/1988 | Tanaka et al. .................... 362/84 |

Primary Examiner—Ira S. Lazarus
Assistant Examiner—Richard R. Cole
Attorney, Agent, or Firm—Renner, Otto, Boisselle & Sklar

[57] ABSTRACT

A light emitting panel and method of making same including an emitter surface having one or more layers of woven fiber optic material with disruptions or bends as discrete locations along the length of the fibers to allow light to be emitted therefrom and which are coated to change the attenuation of the fibers to increase the amount of light emitted therefrom. The panel is particularly suitable for use as a back light for a liquid crystal or other device, the light being transmitted to the emitter surface from a remote light source through a cable or light pipe connected to one or both ends of the emitter surface.

70 Claims, 4 Drawing Sheets

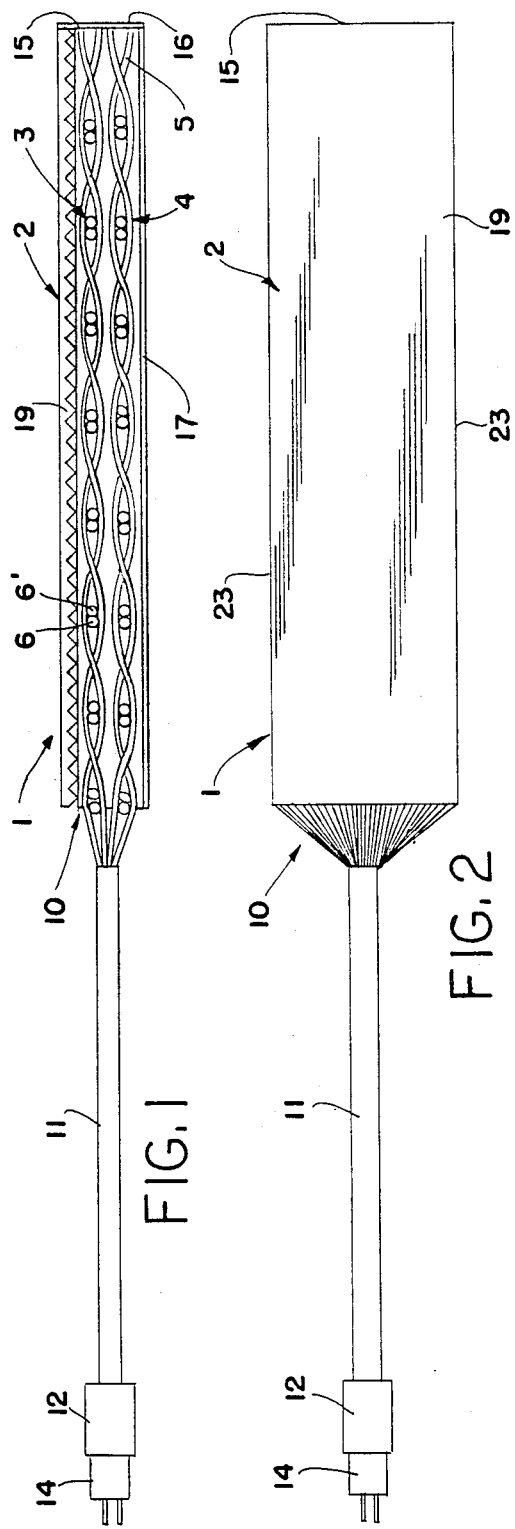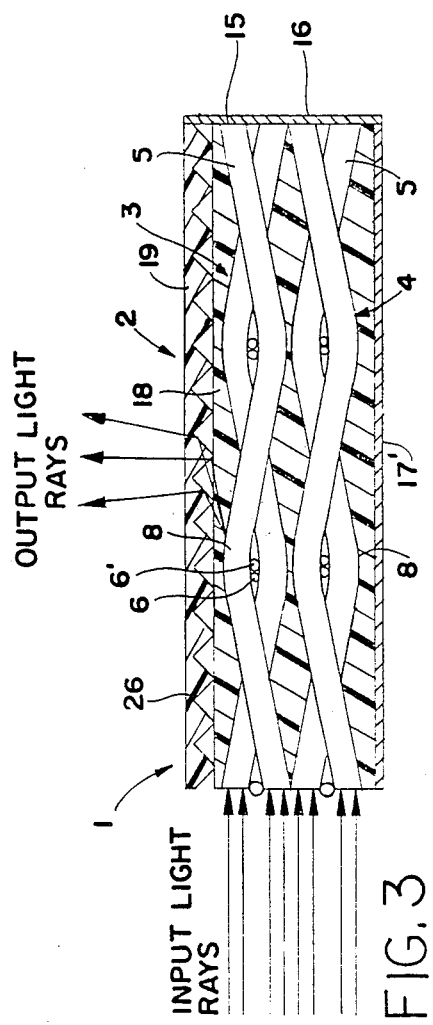

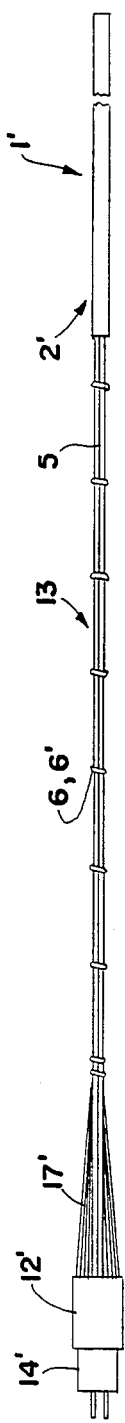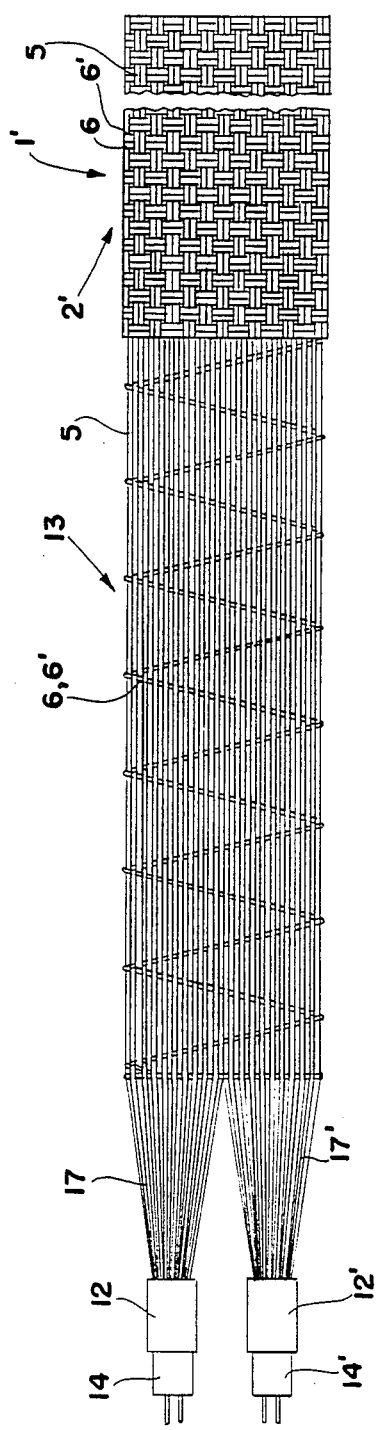
FIG. 10
FIG. 11

FIBER OPTIC LIGHT EMITTING PANEL AND METHOD OF MAKING SAME

BACKGROUND OF THE INVENTION

This invention relates generally as indicated to a fiber optic light emitting panel and method of making same, and more particularly to a light emitting panel including an emitter surface in which optical fibers are woven into a sheet or mat and coated with a material having a refractive index that will cause a change in the attenuation of the optical fibers in the emitter surface to increase the optical efficiency of the panel.

It is generally known to weave optical fibers into a panel or the like and make the panel luminous in one or more selected areas by frustrating the total internal reflection character of the optical fibers in such areas. Illumination in these areas is caused by allowing light which is transmitted to the woven optical fibers through a cable or light pipe from a remote light source to emerge from the optical fibers in the selected areas.

Normally the light entering from one end of an optical fiber passes out the other end thereof after a certain amount of loss takes place. However, if the surface of the optical fiber is disrupted as by scratching or otherwise deformed as by bending the optical fiber at a plurality of discrete locations along its length such that the angle of bend approximately exceeds the angle of internal reflection, light will be emitted at these locations.

One of the primary advantages of constructing a light emitting panel utilizing such optical fibers is that the light source can be located remote from the panel for ease of changeability. Also, because the light source need not be incorporated in the panel itself, the panel can be made quite thin and of almost any size and shape, making it especially suitable for use in the back lighting of liquid crystal materials as well as signs and control panels generally.

However, there is a continuing need to improve the uniformity and efficiency of the light emitted by such fiber optic panels. Also, there is a limit to the amount of light that can be emitted along the length of each fiber. The light that is not emitted is trapped in the fiber and becomes wasted energy. Accordingly, it would be desirable to increase the amount of light that can be emitted from each fiber in order to increase the efficiency of the panel.

SUMMARY OF THE INVENTION

With the foregoing in mind, it is the principal object of this invention to provide a light emitting panel of the type generally described with increased optical efficiency.

Another object is to provide such a light emitting panel and method of making same in which the light output can be made relatively uniform over substantially the entire light emitting surface.

Still another object is to provide such a light emitting panel which emits polarized light with a maximum intensity on planes substantially normal to the emitter surface.

Yet another object is to provide such a light emitting panel which produces a higher light output.

Still another object is to provide such a light emitting panel and method of making same by which multiple layers of fiber optic material are disposed in such a way as to produce a higher light output and minimize the thickness of the panel.

A further object is to laminate such a fiber optical panel to a liquid crystal or other device to provide back lighting therefor.

These and other objects of the present invention may be achieved by making a light emitting panel that has one or more layers of woven fiber optic material that are coated with a coating that changes the attenuation of the fibers in the emitter surface to increase the amount of light emitted therefrom. An epoxy or thermosetting plastic or cement may be used as the coating, which also permits the top surface of the emitting surface to be shaped to shift the planes of maximum intensity of light to a plane that fits a particular application. Also, by changing the optical clarity of the coating, one can change the amount of light diffusion that takes place.

Preferably, a reflective surface is provided on the back and sides of the panel to reflect light back into the panel. Also, while both ends of the woven fiber optic material may be formed into light cables, preferably only one end is thus formed, and the other end is desirably cut and polished and a reflective surface is provided on the cut end to reflect light at the cut end back into the panel.

In accordance with another aspect of the invention, a lenticular or prismatic film may be provided on the front of the emitter surface to shift the angular emission of light from the surface so the emitted light is substantially perpendicular to the plane of the emitter surface.

Further in accordance with the invention, the optical fiber coating may be used to laminate the emitter surface of such a light emitting panel to a liquid crystal and/or flexible pressure switch or other such device to provide back lighting therefor.

In accordance with another aspect of the invention, the various component parts of the assembly may be laminated together utilizing a suitable adhesive or a clear acrylic or plastic film vacuum formed around the assembly.

Also in accordance with the invention, where more than one layer of fiber optic material is used to form the emitter surface, the fiber optic layers may be staggered on perpendicular planes to produce a higher light output and to decrease the overall thickness of the panel.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic fragmentary longitudinal section through one form of fiber optic light emitting panel in accordance with this invention;

FIG. 2 is a top plan view of the light emitting panel of FIG. 1;

FIG. 3 is an enlarged schematic fragmentary longitudinal section through a portion of the emitter surface of the light emitting panel of FIGS. 1 and 2;

FIG. 10 is a schematic side elevation view of another form of fiber optic light emitting panel in accordance with this invention including one or more loosely woven ribbon-type cable members at one end of the panel; and FIG. 11 is a schematic top plan view of the light emitting panel of FIG. 10.

DETAILED DESCRIPTION OF THE PREFERRED EMBODIMENTS

Figure 4A:
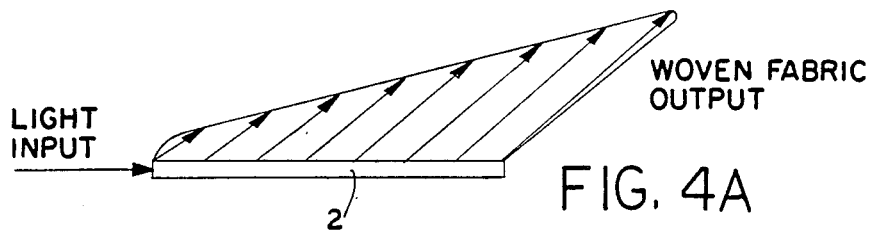
FIGS. 4A, 4B and 4C are schematic illustrations representing the light output of the panel of FIGS. 1 through 3 at different stages during fabrication.

Referring now in detail to the drawings, and initially to FIGS. 1–3, there is schematically shown one form of light emitting panel 1 in accordance with this invention including an emitter surface 2 made of one or more layers 3, 4 of fiber optic material 5. Each layer 3, 4 may be woven into a sheet or mat in the manner disclosed, for example, in U.S. Pat. No. 4,234,907 granted to Maurice Daniel on Nov. 18, 1980, which is incorporated herein by reference. In the example shown in FIGS. 1–3, the fiber optic filaments 5 are woven in only the warp direction and fill threads 6, 6' made, for example, of cotton fiber which acts as a diffuser, are woven in the weft direction. By definition, the weft threads are the threads usually carried by the shuttle in weaving, whereas the warp threads extend lengthwise in the loom, crossed by the weft threads.

Each optical fiber 5 is made from one or more optical fiber strands 7 each including a light transmitting core portion of a suitable transparent material and an outer sheath of a second transparent material having a relatively lower index of refraction than the core material to prevent the escape of light along its length. The core material can be made of either glass or plastic or a multistrand filament having the desired optical characteristics. Likewise, the outer sheath material is desirably equally transparent, but because the index of refraction of the sheath material is less than that of the core material, total reflection is obtained at the sheath-core interface, as well known in the art.

To cause light to be emitted from the optical fibers 5, the external surface of the optical fibers may be disrupted as by scratching or otherwise causing mechanical, chemical or other deformation at discrete locations along their lengths. The amount of light emitted at these locations will depend on the depth and frequency of such disruptions. If the optical fibers are deformed at decreasingly spaced intervals as the distance from the light source increases, there will be more uniform emission of light from the emitter surface when viewed from a distance. Also, such deformation may be achieved by bending the optical fibers 5 at a plurality of discrete locations along their lengths as best seen in FIG. 3 such that the angle of each bend 8 approximately exceeds the angle of internal reflection so that light will be emitted at each such bend.

Figure 7:
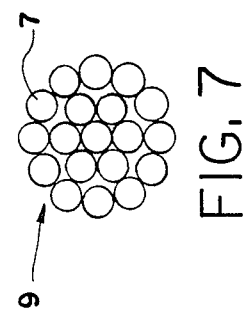
FIG. 7 is an enlarged schematic end view of one form of optical fiber which may be used to make a fiber optic light emitting panel in accordance with the present invention consisting of a plurality of optical fiber strands twisted together to form a single optical fiber.

Each optical fiber 5 may consist of a single optical fiber strand 7. However, preferably a plurality of such strands 7 are twisted together to form a multi-strand optical fiber 9 as schematically shown in FIG. 7 for use as such optical fibers 5. Making a fiber optic light emitting panel 1 utilizing multi-strand optical fibers makes it much easier to bend the optical fibers to the extent necessary to cause light to be emitted from the optical fibers in the light emitting section 2 as desired. Also, glass multi-strand fibers permit the panel to be used to transmit infra-red and ultra-violet frequencies of light, which is not possible with single strand fibers. The ability to transmit infra-red and ultra-violet light is desirable in certain applications, such as when the panel is to be used as an ultra-violet epoxy curing light or as an infra-red heat source.

Figure 9:
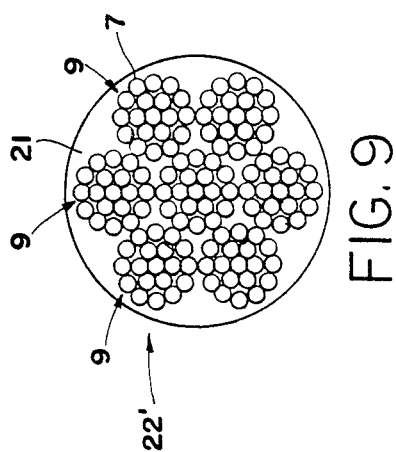
FIGS. 8 and 9 are enlarged schematic end views of two additional optical fiber configurations each consisting of a plurality of optical fibers of the type illustrated in FIG. 7 to form a multi-strand optical fiber cable.
Figure 8:
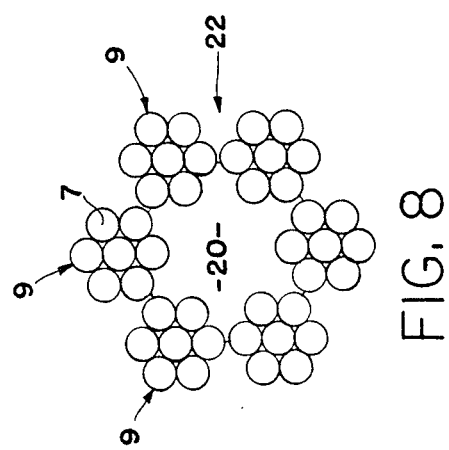

Also, a plurality of such multi-strand optical fibers 9 may be wrapped around a plastic or fiber core 20 and-/or coated with a suitable plastic material 21 to form multi-strand optical fiber cables 22 or 22' as schematically shown in FIGS. 8 and 9, respectively, for use as such optical fibers 5. The core 20 and/or coating 21 may be used separately or combined as desired to help support the optical fibers under tensile-load, which is particularly advantageous where the optical fibers extend from one or both ends of the light emitting panel section for use as a light cable or light pipe for transmitting light from a remote light source as schematically shown in FIGS. 1 and 2. Also, the core 20 may be advantageously used as a back reflector or defuser for the light that is emitted from the emitter surface 2 of the light emitting panel 1 as described hereafter.

The uniformity of illumination of the emitter surface can be varied by varying the shape of disruptions or bends and/or the spacing between the disruptions or bends on the fiber surface as by varying the pattern and tightness of the weave and by varying the proportion of optical fibers to other material in the weave. The illumination can, for example, be increased by making the disruptions closer together or by making the weave progressively tighter as the distance from the light source increases. Using fill threads 6 having different coefficients of friction will help to control the tightness of the weave, in that the higher the coefficient of friction, the tighter it is possible to weave the optical fibers. Also, a plurality of fill threads may be used to provide more surface points for increased friction, and to reduce the thickness of each individual fill thread (and thus the thickness of the panel) while still achieving the same rigidity provided by a thicker fill thread. In the various panel configurations depicted in FIGS. 1, 3 and 5, a double fill thread 6, 6' is preferred.

Different colored fill threads may be used to vary the type or color of light being emitted from the optical fibers. Moreover, the more transparent the fill threads are, the more the emitted light will be permitted to pass through the fill threads.

The optical fibers 5 at one or both ends of the emitter surface 2 may be brought together to form a light cable which is used to transmit light from a remote light source to the emitter surface. In FIGS. 1 and 2 one end 10 of the optical fibers 5 is shown formed into such a light cable 11. Alternatively, a light cable may be formed by loosely weaving the fill threads 6 or 6' at one or both ends of the light emitting section 2' of the panel 1' to act as a harness to produce a ribbon-like cable 13 as schematically shown in FIGS. 10 and 11. The loose weave only acts as a harness for the optical fibers 5 and does not cause the fibers to bend to the degree necessary to emit light in the cable section as does the tighter weave in the light emitting panel section 2'.

At the outermost end of the light cable 11, 13 is a connector 12 which serves as the interface between a light source 14 and the optical fiber ends of the cable, which are desirably polished and held by the connector 12 on a plane perpendicular to the principal optical axis of the light source.

The light source 14 may be of any suitable type including any of the types disclosed in applicant's copending application Ser. No. 125,323, filed Nov. 24, 1987, which is incorporated herein by reference. Furthermore, multiple light sources 14 and 14' may be used for a single light emitting panel 1', either by focusing the light from such multiple light sources onto the end of a single cable or by providing single panel with multiple cable ends 17, 17' each having an individual light source 14, 14' as schematically shown in FIG. 11. Also, if desired, the light source may be epoxied directly to the end of the fiber optic cable.

The other ends 15 of the fiber optic filaments 5 may also be formed into a cable and used to transmit light to the emitter surface from a remote light source if desired. However, as can be seen in FIGS. 1 and 3, the other ends 15 are desirably cut and polished and a reflector 16 is desirably provided at such ends to reflect light at the other ends of the fibers back into the panel. Likewise, the sides 23 are desirably cut and polished and a reflector surface is desirably provided on such sides to reflect light at the sides back into the panel. This is particularly advantageous when the light emitting panel is used in certain back lighting applications where the emitter surface can readily be inserted or slipped in from one side for ease of assembly. Also, a reflective surface 17 may be vacuum deposited directly on the woven material or otherwise mounted to the back of the emitter surface 2 as further shown in FIGS. 1 and 3 to reflect light back through the emitter surface.

In accordance with one aspect of the present invention, the optical fibers 5 in the emitter surface 2 are provided with a coating 18 (see FIG. 3) having a different refractive index than the core material of the optical fibers, such refractive index being such that the coating will cause a change in the attenuation of the light being emitted from the disruptions or bends in the optical fibers in the emitter surface 2. The coating 18 may, for example, be oils, epoxy, gels, translucent plastic, adhesive tape or thermosetting resins and the like. Also silicone could be used for the coating to add flexibility to the panel. The coating may be applied by casting, spraying or injection molding the coating material around the optical fibers. By changing the attenuation of the optical fibers in the emitter surface, one can change the limit on the amount of light that can be emitted from the emitter surface. This change in limit decreases the amount of wasted energy and increases the optical efficiency of the panel.

The woven optical fibers 5 that make up the emitter surface 2 can have coating 18 applied therefore before or after the weaving process. If the coating 18 is applied before weaving, the coating must be sufficiently ductile so as not to adversely affect the weaving process. Also, the coating is at least partially transparent in nature to allow for the passage of light.

In the embodiment shown in FIGS. 1-3, the coating 18 used is a clear epoxy which changes the attenuation a predetermined amount. Also, a lenticular or prismatic film 19 is desirably mounted on the front of the emitter surface 2 to shift the angular emission of light.

FIGS. 4A, B and C schematically represent the light output of the light emitter surface 2 of FIGS. 1-3 at different stages during fabrication. The area under each curve represents the total light output at that stage. Also, the arrows represent the average angular direction of the emitted light rays.

Figure 4B:
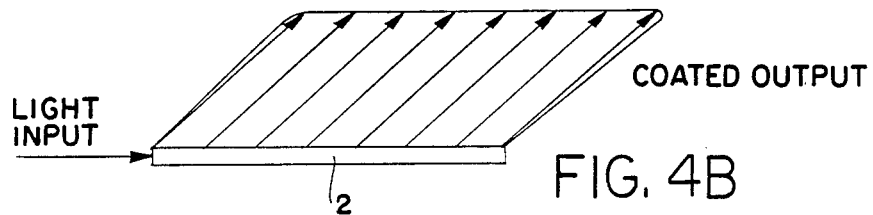
Figure 4C:
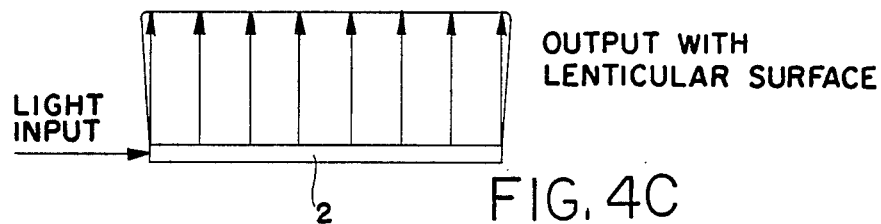

During the weaving of the emitter surface 2, the optical fibers 5 are desirably wove such that their output progressively increases with the distance from the light source as schematically shown in FIG. 4A. Next the coating 18 is applied to change the attenuation of the optical fibers 5 in the emitter surface 2 in order to produce a substantially uniform output and increase the overall output as schematically shown in FIG. 4B. Also, by adding the lenticular film 19, the light rays may be shifted so that they are substantially perpendicular to the plane of the emitter surface 2 a schematically shown in FIG. 4C.

Preferably, the light emitted from the emitter surface 2 of FIGS. 1 through 3 will be polarized, which makes for a highly efficient back light for a liquid crystal display. Normally, a liquid crystal display has lower polarizer mounted between the liquid crystal and the back light. The lower polarizer is an optical device that transforms unpolarized or natural light into polarized light by selective transmission of polarized rays. This selective transmission allows only polarized light to pass and either absorbs or reflects the remaining light. Therefore, a back light in the form of a light emitting panel 1 of the type disclosed herein that emits polarized light will transmit a higher percentage of light through the liquid crystal than if an unpolarized back light of equal intensity were used.

Figure 5:
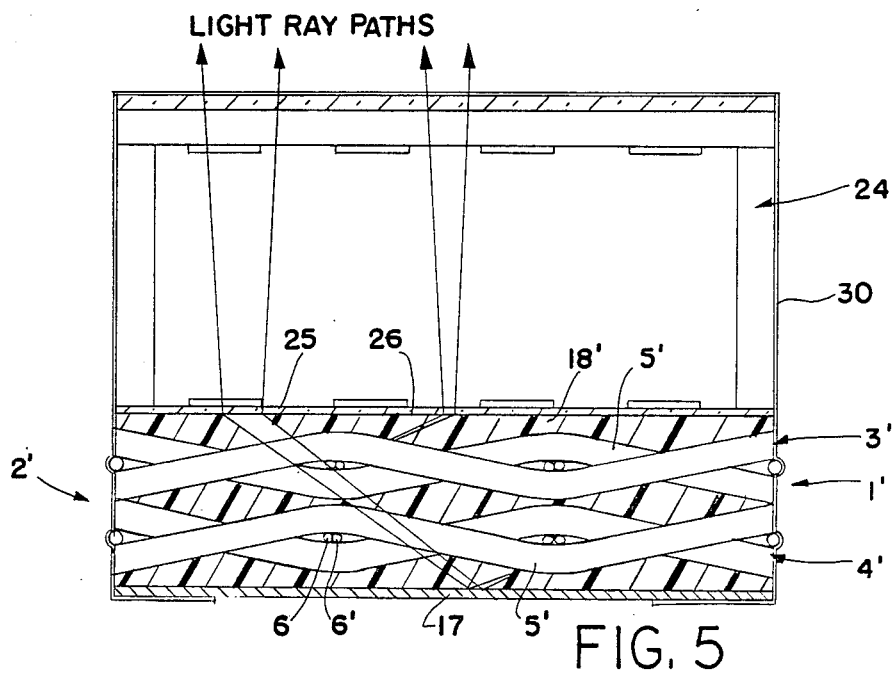
FIG. 5 is an enlarged schematic longitudinal section through another form of fiber optic light emitting panel in accordance with this invention shown laminated to a liquid crystal.

FIG. 5 is a cross-sectional view of a liquid crystal display 24 laminated to an emitter surface 2' of fiber optic panel 1' generally of the type previously described, including a plurality of optical fibers 5 woven into one or more layers 3', 4' and a coating 18' surrounding the woven optical fibers 5' to change the attenuation of the optical fibers a predetermined amount. Also in this embodiment, the coating 18' performs the additional function of acting as a bonding material between the front of the emitter surface 2' and the liquid crystal 24 as well as between the plural fiber optic layers 3', 4' and reflector surface 17'. Alternatively, the various component parts of the assembly may be laminated together utilizing a suitable adhesive (including adhesive tape) or a clear acrylic or plastic film 30 vacuum formed around the assembly as schematically shown in FIG. 5.

A defuser or prismatic film similar to the film 19 shown in FIGS. 1 and 3 may be placed between the lower polarizer 25 of the liquid crystal 24 and the epoxy coating 18' to help smooth the light output if desired. Also, a retardation plate or phase shifter may be used in place of the lower polarizer 25 to rotate the plane of polarization of the light beam to a plane that can readily be transmitted through the liquid crystal.

The use of such a light panel 1 or 1' to back light a liquid crystal display 24 has the advantage that, through the use of a cable or a light pipe 11 or 13 such as shown in FIGS. 1, 2 and 10, 11, a suitable light source can be mounted at a location remote from the emitter surface and liquid crystal where the light source can easily be replaced. Also, such an assembly readily lends itself to using a light source having a relatively long life, such as a light emitting diode, to permit the assembly to function without having to change the light source for as many as 100,000 hours.

If an incandescent or arc lamp is used as the light source, filters of various types can be placed between the light source and the cable end to reflect or absorb undesirable frequencies of light. An example where this would be advantageous is in a military aircraft cockpit display which cannot emit infrared light because of the use of an infrared sighting system.

Another example where this type of light emitting panel could be advantageously used as a back light is in the field of touch-screen liquid crystal displays. Since this type of back light does not produce any electrical fields, heat, or magnetic fields, it does not interfere with the operation of capacitive or resistive sensing touch screens.

Such a light emitting surface 2 with a flat front 26 as shown in FIGS. 1-3 could also be laminated to other devices such as a flexible pressure switch to provide back lighting therefor. Presently pressure switches use electro-luminescent (E-L) panels for back lighting purposes. If the E-L panel fails or burns out, the pressure switch must be taken apart and the E-L panel replaced, which can be a serious problem due to the relatively short life of an E-L panel. However, if a pressure switch is back lighted with a light emitting panel 1 or 1' of the type previously described and the back light should fail, only a remote light source need be changed without having to remove the pressure switch.

FIG. 5 shows typical light ray paths for a light emitting panel 1' that has light input from both ends of the optical fibers 5'. Also, FIG. 5 shows the optical fibers woven into multiple mat layers 3', 4' similar to that shown in FIGS. 1-3.

Figure 6:
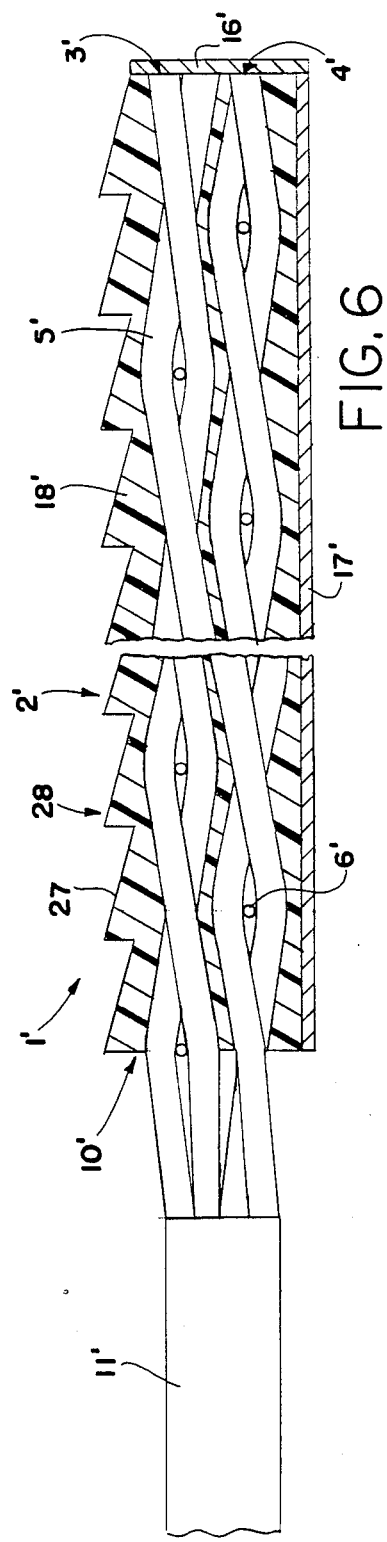
FIG. 6 is an enlarged schematic longitudinal section through still another form of fiber optic light emitting panel in accordance with this invention.

If more than one layer of fiber optic material is provided, the layers 3', 4' can be staggered on perpendicular planes as further shown in FIG. 6 to produce a higher light output and to provide a minimum thickness. Also, the coating 18' surrounding the fiber optic material 5' may be cast sprayed or injection molded around the fibers and to the back reflective surface 17, and the front surface 27 of the emitter surface 2' may be cast in the shape of a lenticular or prismatic surface 28 as further shown in FIG. 6. Otherwise, the light emitting panels shown in FIGS. 5 and 6 are substantially the same as that shown in FIGS. 1 through 3 and 10 and 11 and accordingly the same reference numerals followed by a prime symbol (') are used to designate like parts.

It should be understood that the front surface 27 of the emitter surface 2' of the FIG. 6 embodiment may be cast into different shapes that are more application oriented. An example of this would be a acrylic test tube holder in which the emitter surface of the light emitting panel could be cast just inside the back surface to act as back light for inspection of the test tube contents. This could be particularly important where certain frequencies of light or heat are damaging to the contents. The flexibility and change in fiber attenuation is a function of the casting or injection material.

Also, it should further be understood that the panels can be made to emit light from one or both sides of the panels, and the panels may be of any size or shape. Further, the panels may be rigid, flexible, porous or solid, and the reflective surfaces may be in the form of a vacuum deposit coating on the back, end and sides of the woven emitter surface. Deposition can occur before or after the coating process. Also, the back reflector may be a single sheet or film that has a variety of reflectance characteristics to provide the desired specularity, spread, diffusion, or absorption, which is a function of the application. For example, the back reflector can be made to absorb more light by changing the reflectance or specularity of the reflector in any areas of the light emitting panel section 2 having a higher light output to obtain a more uniform light output. Likewise, the reflectivity of the back reflector may be such that the reflector will absorb or reflect predetermined frequencies of light to adjust the color temperature of the light output.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

I claim:

1. A light emitting panel comprising an emitter surface having a plurality of optical fibers extending from one end of said emitter surface toward another end thereof, said optical fibers having a plurality of disruptions or bends along the length of said optical fibers which cause light entering such optical fibers at said one end to be emitted from said disruptions or bends, said disruptions or bends being formed to cause the light output from said disruptions or bends to progressively increase with the distance from said one end for at least a portion of the length of said emitter surface, and coating means applied to said optical fibers in said portion of said emitter surface having a higher index of refraction than said optical fibers to increase the attenuation of light emitted from said portion of said emitter surface and produce a substantially uniform light output from said portion of said emitter surface.

2. The panel of claim 1 wherein the distance between said disruptions or bends progressively decreases as the distance from said one end increases over said portion of said emitter surface to cause the light output from said disruptions or bends to progressively increase with the distance from said one end for said portion of said emitter surface, said coating means increasing the attenuation of light emitted from said portion of said emitter surface and producing a substantially uniform light output over the length of said portion of said emitter surface.

3. The panel of claim 1 wherein the distance between said disruptions or bends progressively decreases as the distance from said one end increases for substantially the entire length of said emitter surface to cause the light output from said disruptions or bends to progressively increase with the distance from said one end over substantially the entire length of said emitter surface, said coating means increasing the attenuation of light emitted from said emitter surface and producing a substantially uniform light output from said emitter surface over substantially the entire length of said emitter surface.

4. The panel of claim 1 wherein said emitter surface includes plural layers of woven optical fibers.

5. The panel of claim 4 wherein said plural layers of woven optical fibers are staggered on perpendicular planes to produce a higher light output from said woven optical fibers.

6. The panel of claim 4 wherein said plural layers of woven optical fibers are staggered on perpendicular planes to provide a minimum thickness for said emitter surface.

7. The panel of claim 1 wherein said coating means is cast around said optical fibers.

8. The panel of claim 1 wherein said coating means is injection molded around said optical fibers.

9. The panel of claim 1 wherein said coating means is sprayed onto said optical fibers.

10. The panel of claim 1 wherein one end of said optical fibers is formed into a light cable which transmits light from a remote light source to said one end of said emitter surface.

11. The panel of claim 10 wherein the other end and sides of said emitter surface are cut and polished, and reflective surfaces are provided at said other end and sides to reflect light back into said panel.

12. The panel of claim 1 wherein said emitter surface has a front from which light is emitted from said optical fibers and a back and sides having reflective surfaces thereon which reflect light back into said panel.

13. The panel of claim 12 wherein said coating means acts as a bonding material between said emitter surface and said reflective surfaces.

14. The panel of claim 1 wherein said emitter surface has a front from which light is emitted from said optical fibers, further comprising lens means on said front of said emitter surface for shifting the angular emission of light from said optical fibers.

15. The panel of claim 14 wherein said lens means comprises a lenticular or prismatic film.

16. The panel of claim 14 wherein said lens means has a relatively flat front surface.

17. The panel of claim 14 wherein said coating means is formed around said optical fibers.

18. The panel of claim 17 wherein said coating means is shaped to form said lens means.

19. The panel of claim 18 wherein the front of said emitter surface is formed in the shape of a lenticular or prismatic surface.

20. The panel of claim 1 wherein said emitter surface has a front from which light is emitted and a back including reflective surface means thereon that absorbs or reflects predetermined frequencies of light to adjust the color temperature of the light output from said panel.

21. The panel of claim 1 in combination with a remote light source, said optical fibers having light cable means extending from said one end for transmitting light from said remote light source to said emitter surface.

22. The panel of claim 1 wherein said optical fibers are woven in a warp direction, with fill threads woven in a weft direction.

23. The panel of claim 22 wherein said fill threads are made of cotton to increase the friction between said optical fibers and said fill threads and to diffuse the light output from said panel.

24. The panel of claim 1 wherein said optical fibers are woven in a warp direction, with double fill threads woven in a weft direction to control the shape and spacing of the bends in said optical fibers to control the amount of light emitted from each of said bends.

25. The panel of claim 24 wherein said fill threads are made of cotton to increase the friction between said optical fibers and said fill threads and to diffuse the light output from said panel.

26. The panel of claim 1 wherein each of said optical fibers consists of a plurality of optical fiber strands twisted together.

27. The panel of claim 1 wherein each of said optical fibers consists of a plurality of multi-strand cables, each said cable consisting of a plurality of optical fiber strands twisted together.

28. The panel of claim 27 wherein said plurality of cables are wrapped around a core.

29. The panel of claim 27 further comprising a coating surrounding said plurality of cables.

30. The panel of claim 1 wherein said optical fibers are brought together beyond said one end of said emitter surface to form a light cable for transmitting light to said emitter surface from a remote light source.

31. The panel of claim 1 in combination with a remote light source, said optical fibers having light cable means at one end for transmitting light from said remote light source to said one end of said emitter surface.

32. The panel of claim 1 in combination with a device which is back lighted by said panel.

33. The combination of claim 32 wherein said emitter surface has a front which is laminated to said device to provide back lighting therefor.

34. The combination of claim 33 wherein said device comprises a liquid crystal which is laminated to the front of said emitter surface.

35. The combination of claim 34 wherein said coating means acts as a bonding material between the front of said emitter surface and said liquid crystal.

36. The combination of claim 35 further comprising a back reflector bonded to the back of said emitter surface by said coating means.

37. The combination of claim 36 wherein said emitter surface includes plural layers of woven optical fibers.

38. The panel of claim 1 in combination with a plurality of remote light sources, said optical fibers having light cable means at one end for transmitting light from said plurality of remote light sources to said emitter surface.

39. The combination of claim 38 wherein said light cable means comprises a plurality of light cables extending from said one end of said emitter surface for transmitting light from said plurality of remote light sources to said emitter surface.

40. The panel of claim 1 wherein said optical fibers are loosely woven beyond said one end of said emitter surface to form a ribbon-like cable for use in transmitting light from a remote light source to said emitter surface.

41. A method of making a light emitting panel comprising the steps of forming an emitter surface having a plurality of optical fibers extending from one end of said emitter surface toward another end of said emitter surface, providing disruptions or bends in said optical fibers along the length of said optical fibers to cause light entering said optical fibers at said one end to be emitted from said disruptions or bends, said disruptions or bonds being formed to cause the light output from said disruptions or bends to progressively increase with the distance from said one end for at least a portion of the length of said emitter surface, and applying coating means to said optical fibers in said portion of said emitter surface having a higher index of refraction than said optical fibers to increase the attenuation of light emitter from said portion of said emitter surface and produce a substantially uniform light output from said portion of said emitter surface.

42. The method of claim 41 wherein the distance between said disruptions or bends is made to progressively decrease as the distance from said one end increases over the length of said portion of said emitter surface to cause the light output from said disruptions or bends to progressively increase with the distance from said one end for said portion of said emitter surface, said coating means increasing the attenuation of light emitted from said portion of said emitter surface and producing a substantially uniform light output over the length of said portion of said emitter surface.

43. The method of claim 41 wherein the distance between said disruptions or bends is made to progressively decrease as the distance from said one end increases for substantially the entire length of said emitter surface to cause the light output from said disruptions or bends to progressively increase with the distance from said one end for substantially the entire length of said emitter surface, said coating means increasing the attenuation of light emitted from said emitter surface and producing substantially uniform light output from said emitter surface over substantially the entire length of said emitter surface.

44. The method of claim 41 wherein a plurality of layers of woven optical fibers are placed one on top of the other to form said emitter surface.

45. The method of claim 44 further comprising the step of staggering said plural layers of optical fibers on perpendicular planes to provide a minimum thickness for said emitter surface.

46. The method of claim 44 further comprising the step of vacuum forming a thin plastic film around said emitter surface to hold said layers of optical fibers together.

47. The method of claim 41 wherein each of said optical fibers in said emitter surface consists of a plurality of optical fiber strands twisted together.

48. The method of claim 41 wherein each of said optical fibers in said emitter surface consists of a plurality of multi-strand cables, each cable consisting of a plurality of optical fiber strands twisted together.

49. The method of claim 48 wherein each of said optical fibers in said emitter surface comprises a plurality of said multi-strand cables wrapped around a core.

50. The method of claim 48 wherein each of said optical fibers in said emitter surface consists of a plurality of said multi-strand cables held together by a coating surrounding said cables.

51. The method of claim 41 further comprising the step of forming one end of said optical fibers into a light cable which transmits light from a remote light source to said emitter surface, cutting and polishing the other end and sides of said emitter surface, and applying reflective surfaces to the other end and sides of said emitter surface to reflect light back into said panel.

52. The method of claim 41 wherein said emitter surface has a front from which light is emitted from said optical fibers and a back and sides, further comprising the step of applying reflective surfaces to said back and sides which reflect light back into said panel.

53. The method of claim 52 wherein one or more of said reflective surfaces are vacuum deposited directly on said emitter surface.

54. The method of claim 41 wherein said emitter surface has a front from which light is emitted and a back, further comprising the step of providing a reflective surface on said back that absorbs or reflects predetermined frequencies of light to adjust the color temperature of the light output from said panel.

55. The method of claim 41 wherein said emitter surface is formed by weaving said optical fibers in a warp direction with fill threads in a weft direction.

56. The method of claim 53 wherein double fill threads are used in the weaving process to control the shape and spacing of the bends in said optical fibers to control the amount of light emitted from said bends.

57. The method of claim 41 wherein said emitter surface has a front from which light is emitted from said optical fibers, further comprising the step of providing a lens on said front of said emitter surface for shifting the angular emission of light from said optical fibers.

58. The method of claim 57 further comprising the step of shaping said coating means to form said lens.

59. The method of claim 41 wherein said emitter surface has a front from which light is emitted from said optical fibers, further comprising the step of laminating a liquid crystal to said front of said emitter surface.

60. The method of claim 59 further comprising the step of bonding said liquid crystal to said front of said emitter surface with said coating means.

61. The method of claim 41 further comprising the step of loosely weaving said optical fibers together beyond said one end of said emitter surface to provide a ribbon-like cable at said one end for use in transmitting light from a remote light source to said emitter surface.

62. The method of claim 61 wherein said optical fibers are tightly woven together in the region of said emitter surface to bend said optical fibers to allow light to be emitted from said emitter surface.

63. The method of claim 41 wherein said optical fibers are woven together in said emitter surface, and said coating means is applied to said optical fibers prior to the weaving step.

64. A light emitting panel comprising an emitter surface including a plurality of optical fibers which are woven to provide bends at discrete locations along the length of said optical fibers to allow light to be emitted therefrom, and coating means applied to said optical fibers having a refractive index that changes the attenuation of the light emitted from said optical fibers, said optical fibers being woven in a warp direction, with plural fill threads woven in a weft direction to control the shape and spacing of said bends for controlling the amount of light emitted from each of said bends.

65. The panel of claim 64 wherein double fill threads are woven in said weft direction to control the shape and spacing of said bends as aforesaid.

66. The panel of claim 64 wherein said fill threads are made of cotton to increase the friction between said optical fibers and fill threads and to diffuse the light output from said panel.

67. The panel of claim 64 wherein each of said optical fibers consists of a plurality of optical fiber strands twisted together.

68. The panel of claim 64 wherein each of said optical fibers consists of a plurality of multi-strand cables, each said cable consisting of a plurality of optical fiber strands twisted together.

69. The panel of claim 68 wherein said plurality of cables are wrapped around a core.

70. The panel of claim 68 further comprising a coating surrounding said plurality of cables.

* * * * *